United States Patent [19]
Delannoy

[11] Patent Number: 5,188,873
[45] Date of Patent: Feb. 23, 1993

[54] POLYOLEFIN-BASED MOULDABLE COMPOSITIONS AND ARTICLES MADE FROM THESE COMPOSITIONS

[75] Inventor: Vincent Delannoy, Mons, Belgium

[73] Assignee: Solvay (Société Anonyme), Brussels, Belgium

[21] Appl. No.: 782,250

[22] Filed: Oct. 28, 1991

[30] Foreign Application Priority Data

Oct. 26, 1990 [BE] Belgium ............................. 09001022

[51] Int. Cl.⁵ ..................... C08L 23/06; C08L 23/10
[52] U.S. Cl. .................. 428/36.92; 525/199
[58] Field of Search ......................... 525/199

[56] References Cited

U.S. PATENT DOCUMENTS

| | | | |
|---|---|---|---|
| 3,005,795 | 10/1961 | Busse et al. | 525/199 |
| 3,125,547 | 3/1964 | Blatz . | |
| 3,294,871 | 12/1966 | Schmitt et al. | 525/199 |
| 3,334,157 | 8/1967 | Larsen | 525/199 |
| 4,829,116 | 5/1989 | Piesold . | |
| 4,837,074 | 6/1989 | Rosinski et al. . | |
| 4,904,735 | 2/1990 | Chapman, Jr. et al. . | |
| 4,945,126 | 7/1990 | Crosby et al. | 525/199 |

FOREIGN PATENT DOCUMENTS

| | | |
|---|---|---|
| 0124955 | 11/1984 | European Pat. Off. . |
| 0196903 | 10/1986 | European Pat. Off. . |
| 0262783 | 4/1988 | European Pat. Off. . |
| 0282882 | 9/1988 | European Pat. Off. . |
| 61-085457 | 5/1986 | Japan . |

OTHER PUBLICATIONS

Rudin et al.-"Fluoroelastomer Aids in Polyolefin Extrusion"-Plastics Eng. Mar. 1986 pp. 83-86.

*Primary Examiner*—Carman J. Seccuro, Jr
*Attorney, Agent, or Firm*—Spencer, Frank & Schneider

[57] ABSTRACT

Compositions based on polyolefins (high-density polyethylene, polypropylene, etc.) additionally containing at least one fluoropolymer and at least one low-density polyethylene, which can be employed for the production of shaped articles whose application calls for improved optical properties.

7 Claims, No Drawings

POLYOLEFIN-BASED MOULDABLE COMPOSITIONS AND ARTICLES MADE FROM THESE COMPOSITIONS

The present invention relates to polyolefin-based mouldable compositions. It also relates to articles made from these compositions, such as hollow bodies, pipes, films, sheeting, sheets or profiles, whose application calls for improved optical properties (gloss, transparency, surface finish).

It is known to improve the surface quality of extruded articles based on olefin polymers by adding small quantities of fluoropolymers (see, for example, patent U.S. Pat. No. 3,125,547 (du Pont de Nemours)). It is known, furthermore, that the addition of small quantities of wax to these compositions makes it possible to process them by extrusion at a particularly high rate without disturbing the surface quality of the products obtained (patent application EP-A-0,282,882 (Hoechst)). The surface of the various articles obtained from these compositions, while being smooth and free from faults, remains insufficiently glossy.

There have now been found mouldable compositions based on polyolefins containing small quantities of fluoropolymers and of low-density polyethylenes, which make it possible to obtain articles whose optical properties are particularly effective. In particular, these compositions make it possible to obtain articles whose surface is particularly glossy and whose transparency is improved. These compositions can be processed by the various conventional moulding processes, chiefly by extrusion and by injection moulding.

The present invention consequently relates to mouldable compositions (C) based on at least one polyolefin (X), additionally comprising at least one fluoropolymer (Y) and at least one low-density polyethylene (Z).

The polyolefins (X) which can be employed according to the invention are chosen especially from ethylene polymers and propylene polymers, the latter being particularly preferred.

The ethylene polymers are generally chosen from high-density ethylene polymers, more particularly from ethylene homopolymers and its copolymers with an alphamonoolefin containing from 3 to 18 carbon atoms, such as, for example, 1-butene, 1-pentene, methyl-1-butenes, 1-hexene, 3- and 4-methyl-1-pentenes and 1-octene, the density of which is higher than 0.935 and preferably between 0.94 and 0.98. When ethylene copolymers are used, the comonomer is preferably chosen from 1-butene, 1-pentene and 1-hexene, and its concentration is adjusted so as to satisfy the density values of the final polymer as defined above.

The propylene polymers are homopolymers or copolymers of propylene with alpha-olefins whose molecule contains from 2 to 18, preferably from 2 to 8 carbon atoms, such as ethylene, 1-butene, 1-pentene, methyl-1-butenes, 1-hexene, 3- and 4-methyl-1-pentenes and 1-octene. Propylene homopolymers are suitable.

The polyolefins (X) which can also be employed for manufacturing the compositions (C) according to the invention are propylene or ethylene copolymers with diolefins containing from 4 to 18 carbon atoms. The diolefins are preferably unconjugated aliphatic diolefins such as 4-vinylcylcohexene, alicyclic diolefins containing an endocyclic bridge such as dicyclopentadiene, methylene- and ethylidenenorbornene and conjugated diolefins such as butadiene or isoprene.

Other polyolefins (X) which can also be employed according to the invention are olefinic thermoplastic elastomers (called OTE hereinafter), which are mechanical blends of crystalline polyolefins such as polyethylene and polypropylene and of olefinic elastomers such as elastomeric co- and terpolymers of ethylene, propylene and of an optional diene such as 1,4-hexadiene, these elastomers being optionally partially crosslinked; as examples of these OTEs there may be mentioned the products TPR from Uniroyal, Telcar from Goodrich, Nordel TP from du Pont, Dutral TP from Montedison and Santoprene from Monsanto.

These various polyolefins are well known in the art. Their preparation can be carried out conventionally by low-pressure polymerisation in the presence of catalysts of the Phillips type based on hexavalent chromium on a silica-based support, or in the presence of catalysts of the Ziegler-Natta type.

The compositions (C) according to the invention contain at least one fluoropolymer (Y). A fluoropolymer is intended to denote polymers derived from monomers in which the atomic ratio fluorine/carbon is at least ½. The thermal behaviour of these polymers is preferably close to that of the polyolefin (X). In particular, the polymers (Y) must be preferably solid or elastomeric when the polyolefin (X) is solid, and fluid when the latter is in the molten state. Consequently, it is advisable that they should be fluid at temperatures of between 100° and 400° C., preferably between 125° and 280° C. and more particularly between 150° and 250° C. As examples of these polymers (Y) there may be mentioned the polymers derived from fluoroolefins such as vinyl fluoride, vinylidene fluoride, trifluoroethylene, chlorotrifluoroethylene, tetrafluoroethylene, hexafluoropropylene, hexafluoroisobutylene, perfluoroalkoxyolefins and copolymers of these compounds with each other and with unfluorinated olefins such as the copolymers of vinylidene fluoride with chlorotrifluoroethylene or hexafluoropropylene and the copolymers of ethylene with chlorotrifluoroethylene. Polymers (Y) which are more particularly preferred are vinylidene fluoride polymers and copolymers.

The content of fluoropolymers (Y) in the composition (C) is generally between 0.001 and 3% by weight, preferably between 0.005 and 0.5% by weight, more particularly between 0.01 and 0.1% by weight of the total weight of the composition (C).

According to the invention the compositions (C) also contain polymers chosen from ethylene polymers other than the ethylene polymers corresponding to the definition of the polyolefin (X) and whose density is generally lower than or equal to 0.935 (polyethylene (Z)). These polymers can be obtained, in a known manner, by high-pressure radical polymerisation of ethylene or by low-pressure polymerisation with the use of the Ziegler-Natta catalysts or Phillips catalysts referred to above. The preferred polyethylenes are polymers obtained at low pressure and known under the name of "linear low-density polyethylenes" (LLDPE). These polymers are generally obtained by copolymerisation of ethylene with alph-olefins whose molecule contains from 4 to 10 carbon atoms, such as 1-butene, 1-hexene or 1-octene, 1-butene being particularly preferred. The density of these polymers, which depends partially on the comonomer content, can vary from 0.89 to 0.935, more particularly from 0.91 to 0.93.

The content of polyethylenes (Z) in the compositions (C) is generally between 0.01 and 10% by weight, preferably between 0.5 and 6% by weight, more particularly between 1 and 4% by weight relative to the total weight of the composition (C).

It is self-evident that the mouldable compositions according to the invention may contain one or more polyolefins (X), one or more fluoropolymers (Y) and one or more polyethylenes (Z).

In addition to the polyolefin (X), the fluoropolymer (Y) and the low-density polyethylene (Z), the composition (C) may contain usual additives such as stabilisers, pigments or nucleating agents. These additives are chosen, for example, from talc, silica, carbon black or metal oxides. Reactive compounds such as crosslinking agents are preferably excluded from this composition.

The preparation of the compositions according to the invention can be carried out by any methods known in the art. A particularly simple operating method comprises blending, dry and in the desired proportions, the various constituents obtained in powder form. It is also possible to prepare, in a first step, a primary mixture called a masterbatch of low-density polyethylene (Z) rich in fluoropolymer (Y) and containing the possible additives. The fluoropolymer content in this primary mixture is generally between 0.05 and 25% by weight, preferably between 0.5 and 10% by weight, more particularly between 1 and 6% by weight of the mixture. This primary mixture is introduced together with the polyolefin during the conversion process, in proportions which make it possible to obtain a composition (C) according to the invention.

An unforeseen advantage of the compositions (C) according to the invention is the improvement in the optical properties of the articles obtained by processing them. It is found, in fact, that these properties are not only better than those obtained when the polymer (Y) or the polyethylene (Z) is employed by itself as an additive to the polyolefin (X) but are also superior to those that might have been expected from their simultaneous addition. There is therefore a real synergy in the effect of the combined incorporation of the polymer (Y) and of the polymer (Z) as additives to the polyolefin (X).

The compositions (C) according to the invention can be processed by any of the conventional processes for converting plastics, and more particularly by the extrusion, film blowing, extrusion-thermoforming and injection moulding processes. These compositions are particularly suitable for the manufacture of shaped articles whose application calls for improved optical properties (gloss, transparency, etc.). Among these articles there may be mentioned, for example, hollow bodies such as flasks, bottles, storage vessels or containers. These compositions are also suitable for obtaining sheeting, films, pipes, tubing, sheets and profiles.

Example 1, which follows, is used to illustrate the invention. Examples 2R, 3R and 4R are given by way of comparison.

The characterisation of the articles obtained from these compositions (C) and the units expressing the values referred to are detailed below.

The gloss of a surface is measured as the percentage of incident light which is reflected at an angle equal to the angle of incidence (ASTM standard D 523).

The transparency of a solid is measured, according to ASTM standard D 1746, by the fraction of the incident light which does not undergo deviation as it passes through the said solid. This fraction is expressed in %.

EXAMPLE 1

A composition (C) is obtained by dry blending, in a Henschel FM 150 C/K (cold) mixer:
979.2 g of powdered random copolymer based on polypropylene and containing 2.5% of ethylene, marketed under the trademark Eltex P KL001 by Solvay & Cie.
20 g of linear low-density polyethylene powder marketed under the trademark Escorene by Exxon,
0.8 g of powdered polymer based on vinylidene fluoride, marketed under the trademark Solef 11010 by Solvay & Cie.

The resulting mixture, stabilised in a conventional manner, is then granulated in a Troester UP 45/2 granulator and then extruded at 220° C. and blown so as to obtain a flask whose walls, 0.5 mm in thickness, exhibit the following optical properties:

gloss = 71%
transparency = 0.4%

EXAMPLES 2R, 3R AND 4R

These examples are given by way of comparison.

Compositions whose characteristics are given in Table I below are granulated and processed in conditions which are strictly identical with those described in Example 1, to form flasks whose optical properties are also given in Table 1 below.

TABLE I

| Examples | 2R | 3R | 4R |
|---|---|---|---|
| Composition | | | |
| Eltex P KL001, g | 1000 | 980 | 999.2 |
| Escorene, g | 0 | 20 | 0 |
| Solef 11010, g | 0 | 0 | 0.8 |
| Optical properties | | | |
| Gloss, % | 46 | 45 | 58 |
| Transparency, % | 0.1 | 0.1 | 0.3 |

I claim:
1. A mouldable composition (C) based on at least one polyolefin (X) chosen from high-density ethylene homopolymers and copolymers whose density is greater than 0.935 or propylene homopolymers and copolymers, additionally comprising at least one vinylidene fluoride homopolymer or copolymer (Y) present in an amount between about 0.001 and 3 percent by weight, and at least one low-density polyethylene homopolymer or copolymer (Z) whose density is less than or equal to 0.935, present in an amount between about 0.5 and 6% by weight.

2. The composition according to claim 1, wherein the polyolefin (X) is chosen from ethylene homopolymers and copolymers of ethylene with an alphamonoolefin containing from 3 to 18 carbon atoms.

3. The composition according to claim 1, wherein the polyolefin (X) is chosen from propylene homopolymers and the copolymers of propylene with alpha-olefins whose molecule contains from 2 to 18 carbon atoms.

4. The composition according to claim 1, wherein the vinylidene fluoride homopolymer or copolymer (Y) is chosen from polymers derived from monomers in which the atomic ratio fluorine/carbon is at least $\frac{1}{2}$ and which are fluid at temperatures of between about 100° and 400° C.

5. A shaped article obtained by moulding a composition according to claim 1.

6. The article according to claim 5, made by extrusion, film blowing, extrusion-thermoforming or injection moulding.

7. The article according to claim 5, made into a hollow body article selected from the group consisting of flasks, bottles, storage vessels and containers.

* * * * *